(12) United States Patent
Hodes et al.

(10) Patent No.: US 10,706,001 B2
(45) Date of Patent: Jul. 7, 2020

(54) MODULAR AND SCALABLE PCIE CONTROLLER ARCHITECTURE

(71) Applicant: Western Digital Technologies, Inc., San Jose, CA (US)

(72) Inventors: Avichay Haim Hodes, Kfar Ben-Nun (IL); Judah Gamliel Hahn, Ofra (IL); Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/884,109

(22) Filed: Jan. 30, 2018

(65) Prior Publication Data

US 2019/0236046 A1 Aug. 1, 2019

(51) Int. Cl.
*G06F 13/42* (2006.01)
*G06F 13/38* (2006.01)
*G06F 13/40* (2006.01)

(52) U.S. Cl.
CPC .......... *G06F 13/4282* (2013.01); *G06F 13/38* (2013.01); *G06F 13/385* (2013.01); *G06F 13/4063* (2013.01); *G06F 13/4295* (2013.01); *G06F 2213/0026* (2013.01)

(58) Field of Classification Search
CPC ...... G06F 13/38; G06F 13/382; G06F 13/385; G06F 13/387; G06F 13/40; G06F 13/4004; G06F 13/4009; G06F 13/4018; G06F 13/4022; G06F 13/4063; G06F 13/4221; G06F 13/4265; G06F 13/4282; G06F 2213/0026
See application file for complete search history.

(56) References Cited

U.S. PATENT DOCUMENTS

| 7,934,032 B1 * | 4/2011 | Sardella | G06F 13/4022 710/104 |
| 9,880,949 B1 * | 1/2018 | Hanchinal | G06F 13/102 |
| 2008/0205424 A1 * | 8/2008 | Brown | H04L 49/3018 370/419 |
| 2010/0122107 A1 * | 5/2010 | Arimilli | G06F 13/4022 713/600 |
| 2012/0260015 A1 * | 10/2012 | Gay | G06F 13/409 710/301 |

(Continued)

OTHER PUBLICATIONS

"PCI Express—An Overview of the PCI Express Standard". National Instruments. Online Nov. 5, 2014. Retrieved from Internet Nov. 8, 2018. <http://www.ni.com/white-paper/3767/en/> (Year: 2014).*

(Continued)

*Primary Examiner* — Thomas J. Cleary
(74) *Attorney, Agent, or Firm* — Patterson & Sheridan, LLP; Steven Versteeg (57) ABSTRACT

The present disclosure generally relates to a Modular PCIe Unit (MPU), which is a single-lane PCI Express endpoint that can act as either a Stand-Alone Single-Lane or as a (one) Lane in a Multilane Endpoint Unit, composed by cascaded-MPUs. The MPU will include a PCIe link, a PCIe transition, a SoC specific and a PCIe phy that are all unique to the individual MPU. The MPUs are scalable in that a single MPU may be used or, if more MPUs are desired for higher performance, additional MPUs, each of which can be unique, added to create the Multilane Endpoint Unit.

23 Claims, 6 Drawing Sheets

(56) References Cited

U.S. PATENT DOCUMENTS

| | | | | |
|---|---|---|---|---|
| 2013/0318264 | A1* | 11/2013 | Wagh | G06F 13/385 |
| | | | | 710/105 |
| 2014/0365704 | A1* | 12/2014 | Yousuf | G06F 13/28 |
| | | | | 710/308 |
| 2015/0370305 | A1* | 12/2015 | Wietfeldt | G06F 1/3206 |
| | | | | 713/320 |
| 2017/0068630 | A1* | 3/2017 | Iskandar | G06F 13/4022 |
| 2017/0090949 | A1* | 3/2017 | Arms | G06F 9/4411 |
| 2017/0212579 | A1* | 7/2017 | Tirumala | G06F 1/3287 |
| 2017/0337152 | A1* | 11/2017 | Hanchinal | G06F 13/4022 |

OTHER PUBLICATIONS

Wllen, Adam, et al. "Introduction to PCI Express". 2003. Intel Corporation. ISBN 0-9702846-9-1. (Year: 2003).*

* cited by examiner

MODULAR AND SCALABLE PCIE CONTROLLER ARCHITECTURE

BACKGROUND OF THE DISCLOSURE

Field of the Disclosure

Embodiments of the present disclosure generally relate to a Modular PCIe Unit (MPU), which allows the design of low-cost PCI Express controllers, with transparent combination of the controllers in high-performance products.

Description of the Related Art

In the PCIe market, products are distinguished based on performance and power. For example, a low-cost product may have less PCIe lanes and a lower overall performance. On the other hand, a high-performance product may have a higher overall performance, and have a correspondingly more PCIe lanes. The high-performance products are typically targeted at the gamer or performance market segments.

The disparity between low-performance and high-performance results in an efficiency issue. Ideally, each product would have its own unique, finely tuned controller that is tailored to the specific requirements of the desired use. Furthermore, the unique, finely tuned controller would ideally be configured to only utilize the die area and cost structure required to meet the product needs. However, the prohibitive up-front cost of designing and building multiple controllers often drives a compromise, where low-cost products use controllers which are ideally suited to higher-cost product.

Therefore, there is a need in the art for a modular PCIe unit that is capable of addressing multiple performance grade products (from high-end to low-end performance products) without compromising cost and time to market.

SUMMARY OF THE DISCLOSURE

The present disclosure generally relates to a Modular PCIe Unit (MPU), which is a single-lane PCI Express endpoint that can act as either a Stand-Alone Single-Lane or as a (one) Lane in a Multilane Endpoint Unit, composed by cascaded-MPUs. The MPU will include a PCIe link, a PCIe transition, a SoC specific and a PCIe phy that are all unique to the individual MPU. The MPUs are scalable in that a single MPU may be used or, if more MPUs are desired for higher performance, additional MPUs, each of which can be unique, added to create the Multilane Endpoint Unit.

In one embodiment, memory system comprises a first modular PCIe unit; a second modular PCIe unit; and an interconnection bus coupled between the first modular PCIe unit and the second modular PCIe unit. The first modular PCIe unit includes a first PCIe phy; a first PCIe link module coupled to the first PCIe phy; a first PCIe transaction component coupled to the first PCIe link; and a first SoC specific device coupled to the first PCIe transaction component.

In another embodiment, a device comprises: a host device; a storage device; and an interface device coupled between the host device and the storage device, the interface device including a plurality of modular PCIe units, wherein the plurality of modular PCIe units are coupled together with interconnection bus, wherein the interconnection bus is directly coupled to each modular PCIe unit.

In another embodiment, a memory system, comprises: a first means to communicate with a host device; and a second means to communication with the host device, wherein the first means is coupled to the second means with an interconnection bus, wherein the interconnection bus is coupled to the first means at a location within the first means, and wherein the interconnection bus is coupled to the second means at a location within the second means.

In another embodiment, a method of delivering data to a host device comprises: retrieving data from a memory device; delivering a first portion of the retrieved data to a first modular PCIe unit, wherein the first modular PCIe unit has first command data that indicates the first portion of the retrieved data is less than the entire retrieved data; delivering a second portion of the retrieved data to a second modular PCIe unit, wherein the second modular PCIe unit has second command data that indicates the second portion of the retrieved data is less than the entire retrieved data; passing the entire data through an interconnection bus; delivering the first portion of the retrieved data from the first modular PCIe unit to the host device; and delivering the second portion of the retrieved data from the second modular PCIe unit to the host device.

In another embodiment, a method of receiving data from a host device comprises receiving a first portion of data from a host device through a first phy of a first modular PCIe unit; receiving a second portion of data from the host device through a second phy of a second modular PCIe unit; passing the first portion of the data and the second portion of the data through an interconnection bus; sending a first portion of retrieved data to a first modular PCIe unit, wherein the first modular PCIe unit has first command data that indicates the retrieved data is less than the entire retrieved data; sending a second portion of the retrieved data to a second modular PCIe unit, wherein the second modular PCIe unit has second command data that indicates the second portion of the retrieved data is less than the entire retrieved data; and writing all data from the first modular PCIe unit and second modular PCIe to the memory device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a Modular PCIe Unit (MPU), which is a single-lane PCI Express endpoint that can act as either a Stand-Alone Single-Lane or as a (one) Lane in a Multilane Endpoint Unit, composed by cascaded-MPUs. The MPU will include a PCIe link, a PCIe transition, a SoC specific and a PCIe phy that are all unique to the individual MPU. The MPUs are scalable in that a single MPU may be used or, if more MPUs are desired for higher performance, additional MPUs, each of which can be unique, added to create the Multilane Endpoint Unit.

Figure 1:
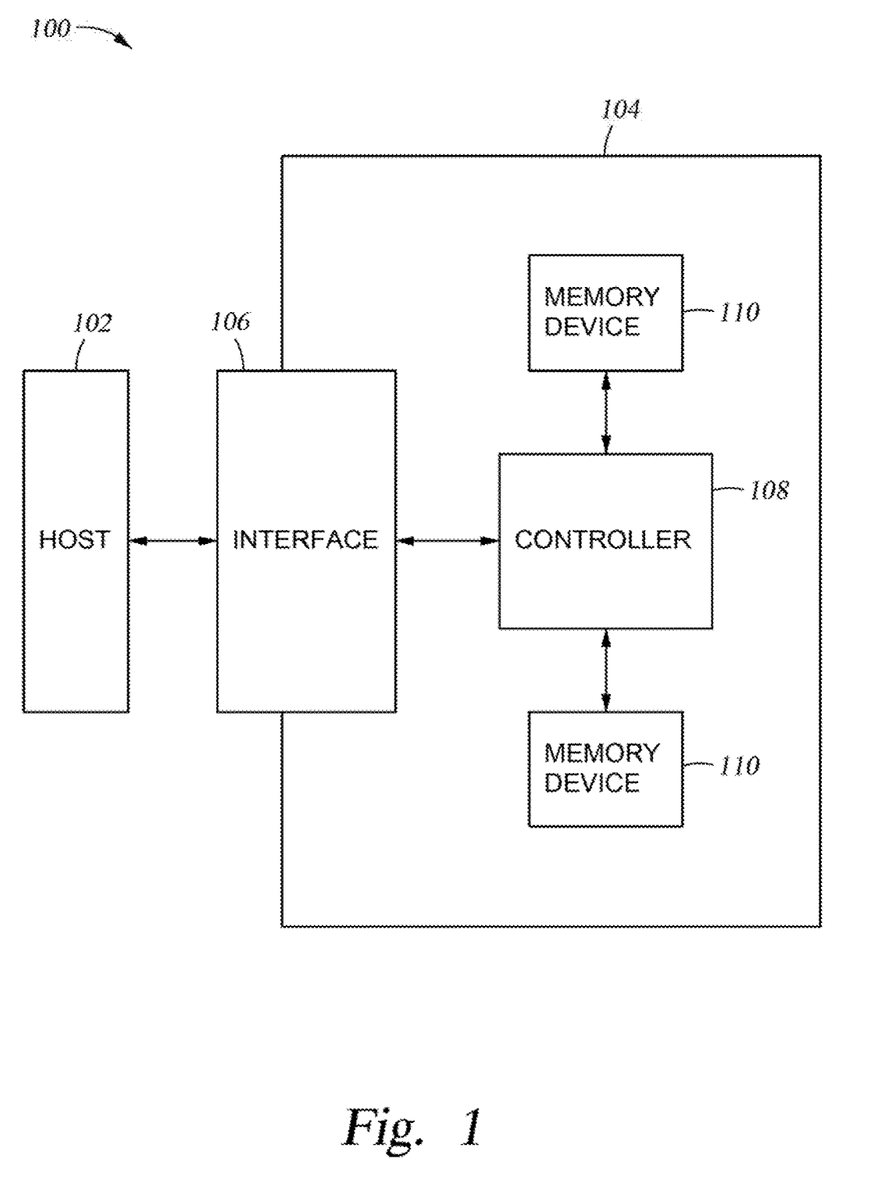
FIG. 1 is an illustrative example of a system including a storage device coupled to a host device.

FIG. 1 describes a block diagram of a particular illustrative example of a storage system 100 having a host device 102 connected to storage device 104. The host device 102 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving).

In certain embodiments, the host device 102 includes any device having a processing unit or any form of hardware capable of processing data, including a general purpose processing unit (such as a CPU), dedicated hardware (such as an application specific integrated circuit (ASIC)), configurable hardware such as a field programmable gate array (FPGA), or any other form of processing unit configured by software instructions, microcode, or firmware. For example, the network may include a data center storage system network, an enterprise storage system network, a storage area network, a cloud storage network, a local area network (LAN), a wide area network (WAN), the Internet, and/or another network.

In some implementations, the data storage device 104 may be a network-attached storage (NAS) device or a component (e.g., a solid-state drive (SSD) device) of a data center storage system, an enterprise storage system, or a storage area network. The data storage device 104 is coupled to the host device 102 by an interface 106.

In some implementations, the data storage device 104 may be embedded within the host device 102, such as in accordance with a Joint Electron Devices Engineering Council (JEDEC) Solid State Technology Association Universal Flash Storage (UFS) configuration. For example, the data storage device 104 may be configured to be coupled to the host device 102 as embedded memory, such as eMMC® (trademark of JEDEC Solid State Technology Association, Arlington, Va.) and eSD, as illustrative examples. To illustrate, the data storage device 104 may correspond to an eMMC (embedded MultiMedia Card) device. As another example, the data storage device 104 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the data storage device 104 may be removable from the host device 102 (i.e., "removably" coupled to the host device 102). As an example, the data storage device 104 may be removably coupled to the host device 102 in accordance with a removable universal serial bus (USB) configuration.

Alternatively or in addition, one or more aspects of the data storage device 104 may be implemented using a microprocessor or microcontroller programmed (e.g., by executing instructions) to perform one or more operations described herein, such as one or more operations of the methods.

The data storage device 104 includes a controller 108 that is coupled to the interface 106. The data storage device 104 also includes memory devices 110. The memory devices 110 include volatile memory devices and non-volatile memory devices. Both the volatile memory devices and the non-volatile memory devices, collectively referred to as memory devices 110, are coupled to the controller 108. Although the controller 108 and certain other components described herein are illustrated as block components and described in general terms, such components may include one or more microprocessors, state machines, and/or other circuits configured to enable the data storage device 104 (or one or more components thereof) to perform operations described herein. Components described herein may be operationally coupled to one another using one or more nodes, one or more buses (e.g., data buses and/or control buses), one or more other structures, or a combination thereof. One or more components described herein may include one or more physical components, such as hardware controllers, state machines, logic circuits, one or more other structures, or a combination thereof, to enable the data storage device 104 to perform one or more operations described herein. Each memory device 110 may have a different configuration. For example, flash memory devices may be configured in a NAND or a NOR configuration.

Suitable volatile memory devices that may be used include dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information.

Non-volatile memory devices may be configured for long-term storage of information as non-volatile memory space and retains information after power on/off cycles. The non-volatile memory devices may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in the non-volatile memory device. In such a configuration, each platter may contain one or more regions of one or more tracks of data. The non-volatile memory device may include one or more types of non-volatile memory.

Currently, separate controllers are utilized for each "swim lane" group of the interface 106. A "swim lane" is the PCIe lane connecting the PCIe unit to the interface. A "swim lane" group is a plurality of "swim lanes" connected to a common PCIe unit. For example, a single lane PCIe unit has a single "swim lane". A multi lane unit has a single PCIe unit, but multiple "swim lanes". PCIe provides lower latency and higher data transfer rates than parallel busses such as PCI and PCI-X. With PCIe, data is transferred over two signal pairs: two wires for transmitting and two wires for receiving. Each set of signal pairs is called a "lane" or "swim lane" and each lane is capable of sending and receiving eight-bit data packets simultaneously between two points. PCIe can scale from one to 32 separate lanes and is typically deployed with 1, 4, 8, 12, 16 or 32 lanes. The "lane" or "swim lane" count of a PCIe card is a determining factor in performance and therefore in price. For example, an inexpensive PCIe device like a NICs might only use four lanes (PCIe x4). By comparison, a high-performance graphics adapter that uses 32 lanes (PCIe x32) for top-speed transmission would be more expensive.

Figure 2:
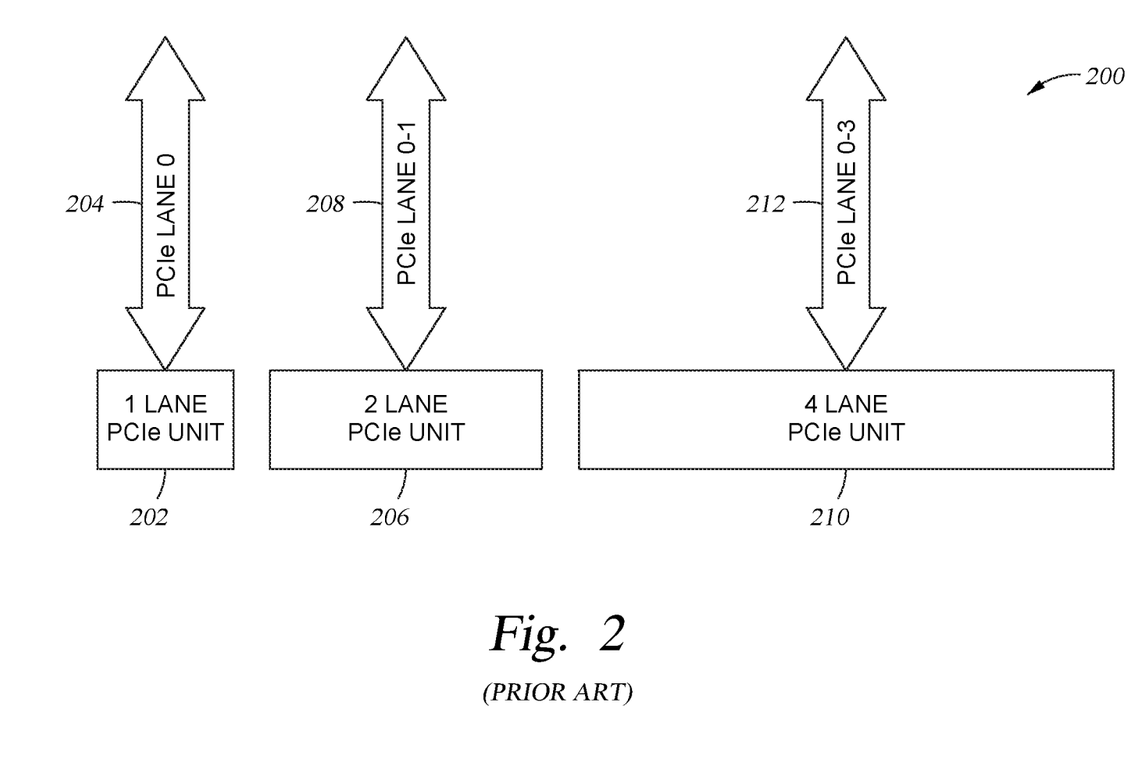
FIG. 2 is an illustration of a traditional PCIe scaling system.

FIG. 2 is illustrates a traditional approach to scaling swim lanes by using a dedicated tailored controller for each lane. Furthermore, building block-cell lanes with different bandwidth requirements to support different application-specific integrated circuits (ASIC). For example, if there are multiple products with different performance requirements per product, separate controllers are used for each product. For example, one as a controller to deliver up to 1 GBps, one controller to deliver up to 2 GBps, and one controller to deliver up to 4 GBps. In FIG. 2, PCIe unit 202 has one lane 204 (PCIe lane 0) and thus can deliver up to 1 GBps. PCIe unit 206 has two lanes 208 (PCIe lanes 0-1) and thus can deliver up to 2 GBps. PCIe unit 210 has four lanes 212 (PCIe lanes 0-3) and thus can deliver up to 4 GBps. The PCIe units 202, 206, 210 are scalable, but the scaling up from the first PCIe unit 202 occurs in multiples of two lanes. In other words, the first unit may be a single lane, but there will not be two single lane PCIe units. It is to be understood that the first unit need not be a single lane, but rather may have multiple lanes so long as the number of multiple lanes in for the unit is an even number of lanes.

Figure 3:
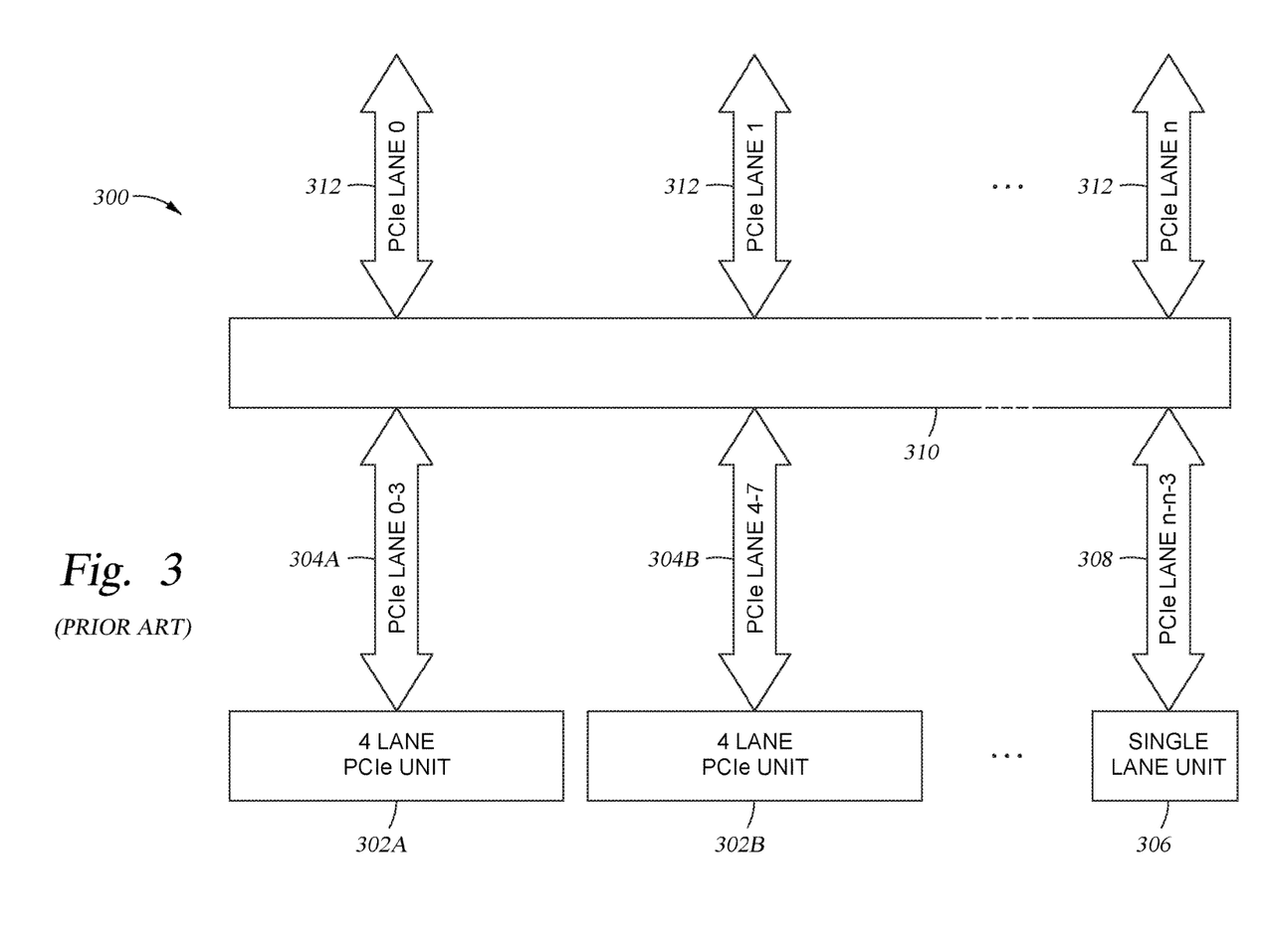
FIG. 3 is an illustration of a traditional PCIe scaling system lanes by using a PCIe Switch.

Another method that may be used it deploying a PCIe switch to scale lanes by leveraging a reduced-lane unit on the backend. FIG. 3 illustrates system 300 having a traditional approach scaling system lanes using a switch. In this example, multiple four lane units are connected into one n+1 endpoint. FIG. 3 shows a plurality of 4-lane PCIe Units 302A, 302B. It is to be understood that more 4-lane PCIe units may be present. Each four lane unit 302A, 302B includes four lanes 304A, 304B. For unit 302A, the lanes 304A are PCIe lanes 0-3. For unit 302B, the lanes 304B are PCIe lanes 4-7. While not explicitly shows, the next PCIe unit would have PCIe lanes 8-11. The last PCIe unit 306 is a single lane PCIe unit with the four lane 308 being PCIe lanes n to n−3 where "n" is the total number of lanes for the entire system 300 minus 1.

In system 300, the lanes 304A, 304B, 308 for the PCIe units 302A, 302B, 306 all feed into a common PCIe switch 310. The switch 310 includes n+1 lanes 312 in total. The lanes 312 couple the switch 310 to the interface or host device. There is a single switch 310 per system 300. The switch 310 endpoint allows the separate lane units to act as one system. As one system, the PCIe units 302A, 302B, 306 can collectively pass the total bandwidth needed by the system 300 to pass through. Bandwidth is a range of frequencies in a given band that is used to transmit signals between components.

Figure 4:
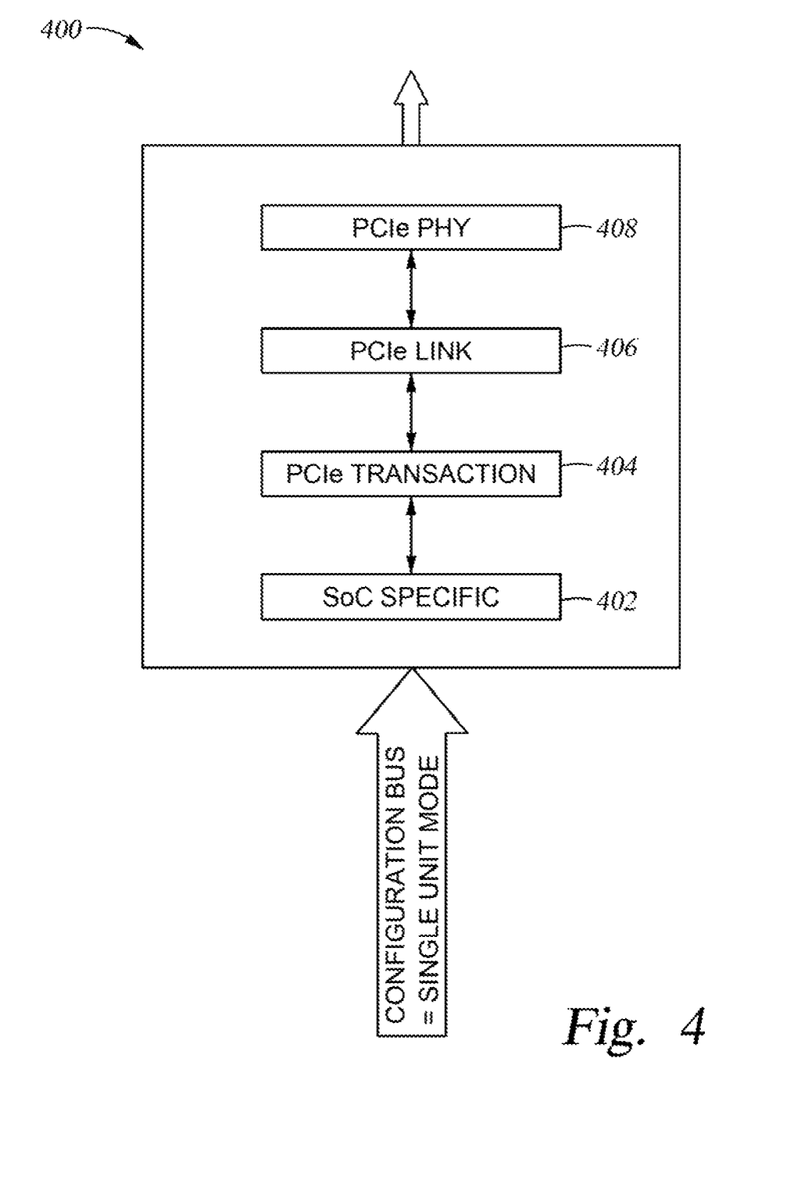
FIG. 4 is a block diagram of a single, Modular PCIe unit according to one embodiment.

FIG. 4 is a block diagram of a single, Modular PCIe unit 400 according to one embodiment. The unit 400 includes a SoC specific device 402, a PCIe transaction component 404, a PCIe link module 406 and a PCIe phy 408. The SoC specific device 402 is a system on chip device. The SoC specific device 402 may be unique to each unit 400. Alternatively, if the units 400 will be scaled together to make a system, the SoC specific device 402 may be substantially identical for each unit 400. It is contemplated that for a system that includes multiple units 400, some SoC specific devices 402 may be identical in for a plurality of units 400 while SoC specific devices 402 in additional units 400 within the same system may be different.

At the PCIe link module 406, three specific jobs are executed. First, sequencing transaction layer packets (TLPs) that are generated by the PCIe transaction component 404. Second, the PCIe link module 406 ensures reliable delivery of TLPs between two endpoints via an acknowledgement protocol that explicitly requires replay of unacknowledged/bad TLPs. Third, the PCIe link module 406 must initialize and manage the flow control credits.

The PCIe link module 406 is built around dedicated unidirectional couples of serial (1-bit), point-to-point connections known as lanes. The PCIe transaction component 404, implements split transactions (transactions with request and response separated by time), allowing the link to carry other traffic while the target device gathers data for the response. Lastly, the SoC specific device 402 determines, based on requests, where to store data of the TLPs. PCI Express protocol can be used as data interface to flash memory devices, such as memory cards and solid-state drives (SSDs).

The unit 400, which is a single lane PCIe endpoint, can act as either a stand-alone single lane unit or as a single lane within a multilane endpoint unit where the multilayer endpoint unit is composed by cascaded PCIe units 400, otherwise referred to as modular PCIe units (MPUs). As will be discussed below, the MPU will include three main external buses: the PCIe bus, a single host interface bus, and a configuration vector bus with a fixed value per system that is determined by the required functionality of each MPU. The configuration vector bus is an interconnection bus connecting all of the MPUs together into a sole endpoint unit. The interconnect delivers the lane data to the entire MPU set, such that the MPU design fully leverages the capabilities of a single lane, while allowing performance to scale linearly in an array. By leveraging the MPUs, it is possible to generate a controller with any number of lanes by cascading a predetermined number of MPUs. For the embodiment of FIG. 4, the configuration bus equals single unit mode.

Figure 5:
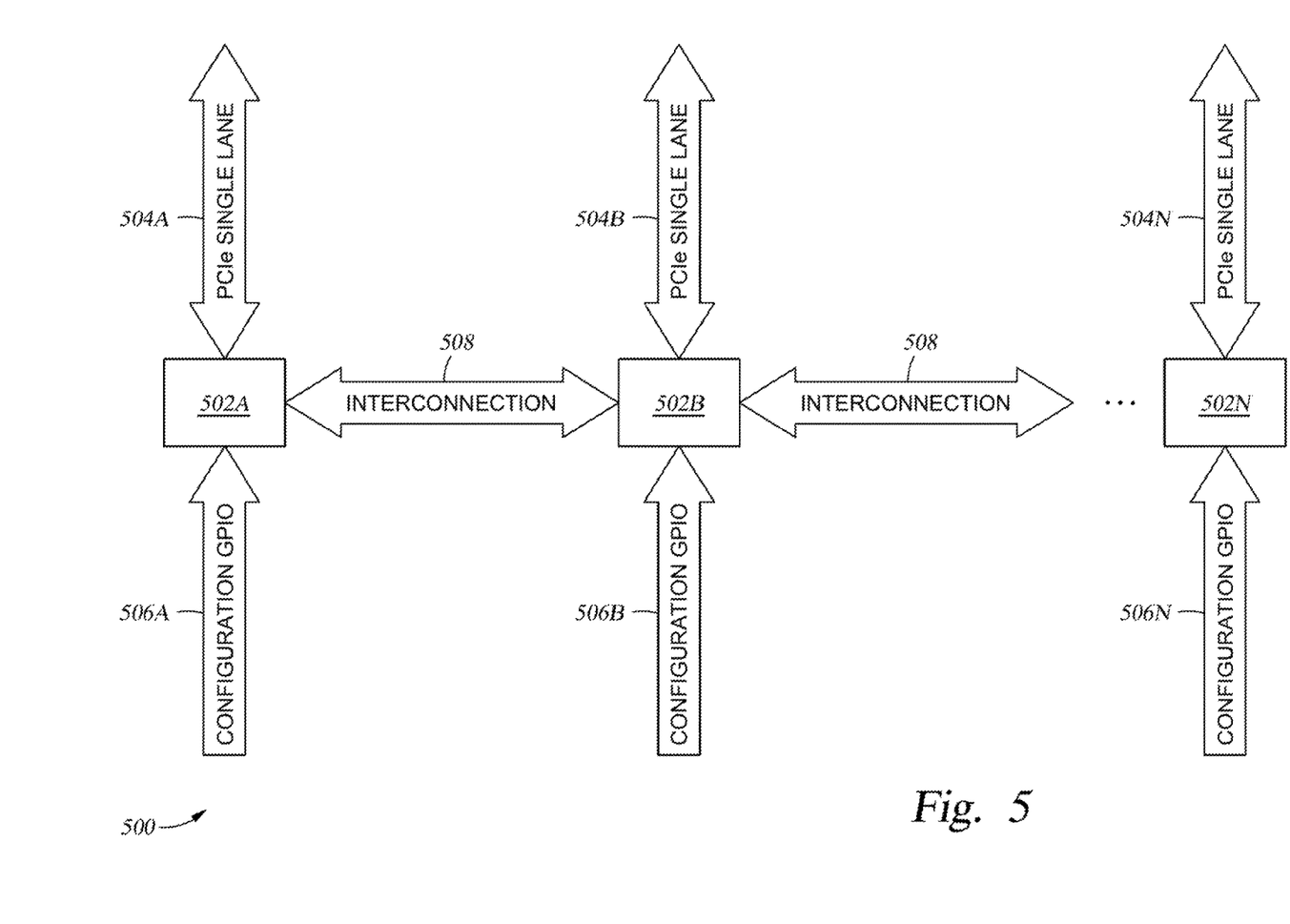
FIG. 5 is a block diagram of a Multilane Endpoint System according to one embodiment.

FIG. 5 is a block diagram of a Multilane Endpoint System 500 according to one embodiment. The system 500 includes a plurality of MPUs 502A-502N. Each MPU 502A-502N has a single PCIe lane 504A-504N exiting the MPU 502A-502N. Each MPU 502A-502N also has a single input configuration GPIO 506A-506N. Each MPU 502A-502N is interconnected to an adjacent MPU 502A-502N by an interconnect 508. The total number of interconnects 508 is N−1 where "N" is the total number of MPUs 502A-502N. The system 500 can be hard wired as desired. For example, the configuration vector bus can be hard wired so that the system has functions as stand-alone lanes (000), 2 lanes in a multilane mode (001), four lanes in a multilane mode (010), 8 lanes in a multilane mode (011), or 16 lanes in a multilane mode (100). It is to be understood that additional lanes are possible.

In order to enable the functionality of each MPU 502A-502N, the MPU interconnection bus will be configured to transfer each of the captured PCIe symbols by the several PCIe phys 408 into each of the PCIe link modules 406 such that each PCIe link module 406 will be able to read the captured word by cascading all symbols. For output data, the bus should automatically route each symbol only to the proper PCIe phy 408, which can be done by the connectivity bus discussed below.

The MPUs can scale to any number of PCIe lanes desired based upon the MPU configuration. As will be discussed below, in one embodiment, the MPU interconnection bus may be implemented between the PCIe phy 408 an the PCIe link module 406 while in other embodiments the MPU interconnection bus may be implemented between the PCIe link module 406 and the PCIe transaction component 404. The MPU interconnection bus is responsible for syncing all MPUs while generating PCIe packets over several lanes correctly.

Figure 6:
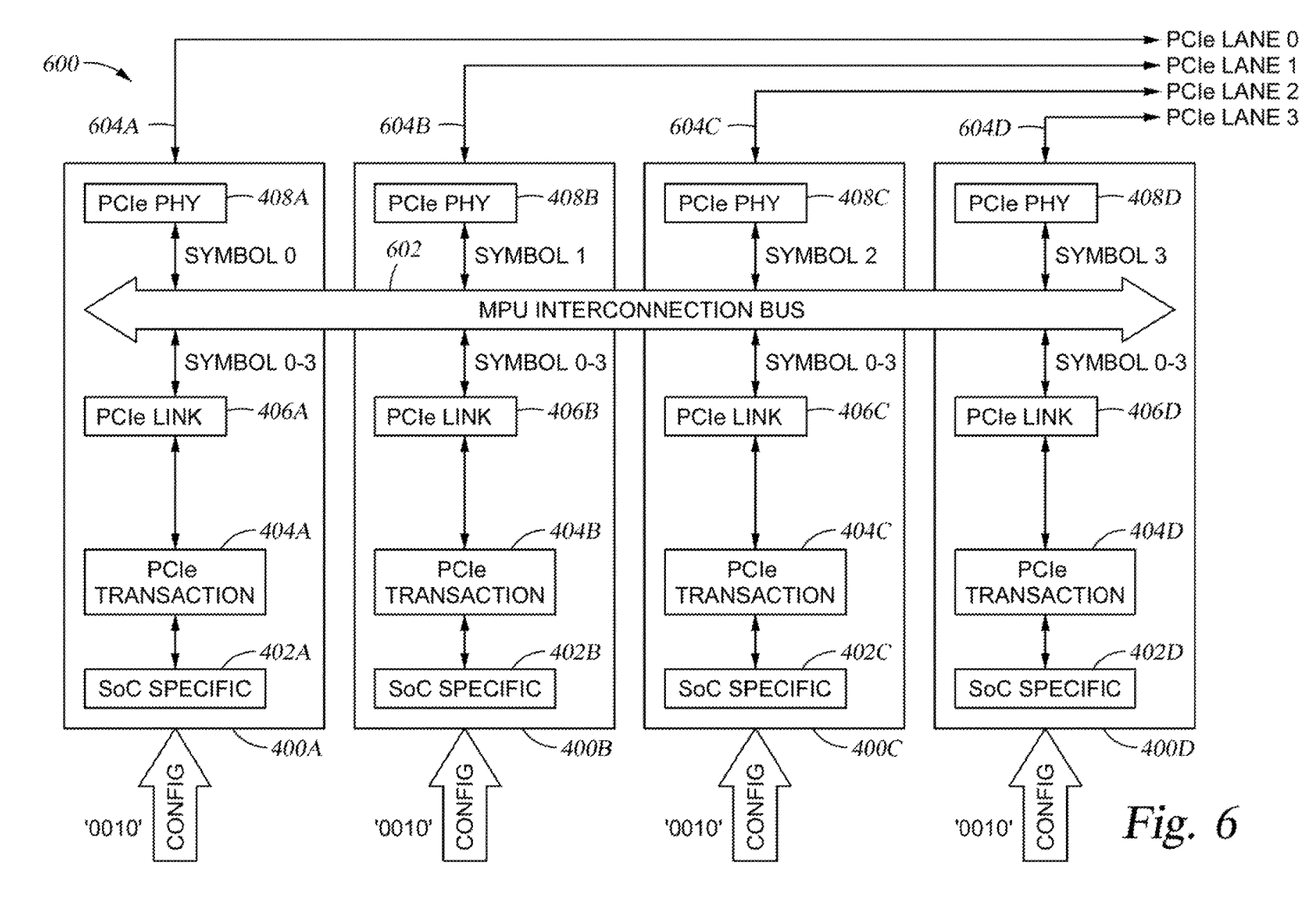
FIG. 6 is a block diagram of a Multilane Endpoint System with an interconnection bus according to one embodiment.

FIG. 6 is a block diagram of a Multilane Endpoint System (MES) 600 with an interconnection bus 602 according to one embodiment. The MES 600 includes a plurality of MPUs 400A-400D. It is to be understood that while four MPUs 400A-4000 have been shown, as few as two MPUs may be used and as many as desired may be used. Thus, the implementations should not be limited to four MPUs. In the embodiment shown in FIG. 6A, the SoC specific devices 402A-402D are each coupled to a corresponding PCIe transaction component 404A-4040. Additionally, each PCIe transaction component 404A-4040 is coupled to a corresponding PCIe link module 406A-406D. Each PCIe link module 406A-4060 is coupled to the MPU interconnection bus 602. Each MPU 400A-400D also has a corresponding PCIe phy 408A-408D that is coupled to the MPU interconnection bus 602. Each PCIe phy 408A-408D is coupled to a corresponding, bidirectional PCIe lane 604A-6040. The PCIe lanes 604A-6040 are coupled to the controller 108.

The interconnection bus 602 allows data to be delivered to each lane of the entire system 600. Through the interconnection bus 602, each component of the system 600 can communicate with one another and act as one. The system 600 is scalable by adding additional MPUs 400A-4000. The amount of MPUs 400A-400D in a system is based upon the amount of bandwidth needed to be transmitted through the system. The interconnection bus 602 is where each lane is connected and can communicate lane specific data with the other lanes, which allows the portion of data sent through each lane to combine as one data address.

In operation, all of the data passing through the MPUs 400A-400D is available on the MPU interconnection bus 602. For data coming into the MPUs 400A-400D, the data initially passes through a specific PCIe phy 408A-4080, and then all of the data is available on the MPU interconnection bus 602. The MPU interconnection bus 602 ensures that the data that comes through the MPU interconnection bus 602 is delivered to the correct PCIe link module 406A-406D. All MPUs 400A-4000 have access to all of the data coming through the MPU interconnection bus 602, but only the data needed for the individual MPU 400A-400D is ultimately delivered to the SoC specific device 402A-402D. In other words, while all MPUs 400A-400D can "see" all of the data, each MPU 400A-400D only writes the data that the particular MPU 400A-400D needs to write. The corresponding PCIe link module 406A-406D determines what data is needed from the MPU interconnection bus 602 and the PCIe transaction component 404A-4040 sends the corresponding write command to the corresponding SoC specific device 402A-402D to write only the necessary data. Thus, all of the data sent to the system 600 is available to the individual MPUs 400A-400D at the MPU interconnection bus 602, the PCIe link module 406A-406D and the PCIe transaction component 404A-4040. Depending upon redundancies, all of the data can be stored in one or more SoC specific devices 402A-402D or only a portion of the data can be stored in individual SoC specific devices 402A-402D.

For reading data, the data takes the opposite path. The available data is retrieved from the SoC specific device 402A-402D. The PCIe transaction component 404A-4040 and the PCIe link modules 406A-406D both know what data to expect, not just from the individual SoC specific devices 402A-4020, but from the entire system 600 for the specific read request. The necessary data expected from an individual MPU 400A-400D is eventually delivered to the MPU interconnection bus 602 which then determines the proper PCIE phy(s) 408A-408D through which to deliver the requested data.

In one implementation, a memory system comprises: a first modular PCIe unit; a second modular PCIe unit; and an interconnection bus coupled between the first modular PCIe unit and the second modular PCIe unit. The first modular PCIe unit includes: a first PCIe phy; a first PCIe link module coupled to the first PCIe phy; a first PCIe transaction component coupled to the first PCIe link; and a first SoC specific device coupled to the first PCIe transaction component. The second modular PCIe unit comprises: a second PCIe phy; a second PCIe link module coupled to the second PCIe phy; a second PCIe transaction component coupled to the second PCIe link; and a second SoC specific device coupled to the second PCIe transaction component. The interconnection bus is coupled to the first modular PCIe unit and the second modular PCIe unit at a location disposed: between the first PCIe phy and the first PCIe transaction component in the first modular PCIe unit; and between the second PCIe phy and the second PCIe transaction component in the second modular PCIe unit. More specifically, the location is disposed: between the first PCIe phy and the first PCIe link module in the first modular PCIe unit; and between the second PCIe phy and the second PCIe link module in the second modular PCIe unit. Alternatively, the location is disposed: between the first PCIe link module and the first PCIe transaction component in the first modular PCIe unit; and between the second PCIe link module and the second PCIe transaction component in the second modular PCIe unit. Alternatively, the interconnection bus is coupled between the first PCIe phy and the first PCIe link module. The first PCIe phy has a single lane coupled to the interconnection bus. The first PCIe link module has four lanes coupled to the interconnection bus. The interconnection bus is coupled between the first PCIe link module and the first PCIe link module. Additionally, the memory system additionally comprises a plurality of additional modular PCIe units.

In another implementation, a device, comprises a host device; a storage device; and an interface device coupled between the host device and the storage device, the interface device including a plurality of modular PCIe units, wherein the plurality of modular PCIe units are coupled together with interconnection bus, wherein the interconnection bus is directly coupled to each modular PCIe unit. Each modular PCIe unit has a PCIe phy and a SoC specific device. Each SoC specific device performs a distinct, unique process. The interconnection bus is coupled to each modular PCIe unit at a location disposed between the PCIe phy and the SoC specific device of each modular PCIe unit.

In another implementation, a memory system, comprises: a first means to communicate with a host device; and a second means to communication with the host device, wherein the first means is coupled to the second means with an interconnection bus, wherein the interconnection bus is coupled to the first means at a location within the first means, and wherein the interconnection bus is coupled to the second means at a location within the second means. The first means comprises: a first phy; first means for sequencing data packets; first means for splitting transactions; and first means to determine where to store data. The interconnection bus is coupled to the first means at a location disposed between the first phy and the first means for sequencing data packets. The interconnection bus is coupled to the first means at a location disposed between the first means for sequencing data packets and the first means for splitting transactions. The first means additionally comprises first means for ensuring reliable delivery of transaction layer packets. The first means additionally comprises first means for initializing and managing flow control credits.

In another implementation, a method of delivering data to a host device comprises: retrieving data from a memory device; delivering a first portion of the retrieved data to a first modular PCIe unit, wherein the first modular PCIe unit has first command data that indicates the first portion of the retrieved data is less than the entire retrieved data; delivering a second portion of the retrieved data to a second modular PCIe unit, wherein the second modular PCIe unit has second command data that indicates the second portion of the retrieved data is less than the entire retrieved data; passing the entire data through an interconnection bus; delivering the first portion of the retrieved data from the first modular PCIe unit to the host device; and delivering the second portion of the retrieved data from the second modular PCIe unit to the host device. The retrieved data is available to both the first modular PCIe unit and the second modular PCIe unit at the interconnection bus.

In another implementation, a method of receiving data from a host device comprises: receiving a first portion of data from a host device through a first phy of a first modular PCIe unit; receiving a second portion of data from the host device through a second phy of a second modular PCIe unit; passing the first portion of the data and the second portion of the data through an interconnection bus; sending a first portion of retrieved data to a first modular PCIe unit, wherein the first modular PCIe unit has first command data that indicates the retrieved data is less than the entire retrieved data; sending a second portion of the retrieved data to a second modular PCIe unit, wherein the second modular PCIe unit has second command data that indicates the second portion of the retrieved data is less than the entire retrieved data; and writing all data from the first modular PCIe unit and second modular PCIe to the memory device. The method additionally comprises receiving a third portion of data from the host device through a third phy of a third modular PCIe unit.

The embodiments discussed herein provide a more efficient approach to high-performance controller scaling where the primary differentiator is PCIe configurations. While the embodiments still utilize the controller back end to support performance targets of the highest targeted "swim lane", modularizing the front end simplifies the rapid creation of derivative products and reduces cost and controller die size in low cost products. The MPU tailored controllers can be used to make anything from an ultra mobile memory device for leveraging a single MPU to improving end user value leveraging two MPUs, to leveraging four MPUs for mainstream memory devices, to even leveraging eight MPUs for computer enthusiasts and gamers.

While the foregoing is directed to embodiments of the present disclosure, other and further embodiments of the disclosure may be devised without departing from the basic scope thereof, and the scope thereof is determined by the claims that follow.

What is claimed is:
1. A memory system, comprising:
   a first modular PCIe unit, the first modular PCIe unit including:
      a first PCIe phy;
      a first PCIe link module coupled to the first PCIe phy;
      a first PCIe transaction component coupled to the first PCIe link module; and
      a first SoC specific device coupled to the first PCIe transaction component;
   a second modular PCIe unit; and
   a single interconnection bus coupled between the first modular PCIe unit and the second modular PCIe unit, wherein the first modular PCIe unit can communicate with the second modular PCIe unit through the single interconnection bus, wherein the single interconnection bus is configured to combine a portion of data sent through the first modular PCIe unit and the second modular PCIe unit as one data address, wherein at least one of the first modular PCIe unit and the second modular PCIe unit is configured to:
      sequence all transaction layer packets (TLPs) that are generated by the PCIe transaction component;
      ensure reliable delivery of TLPs between two endpoints via an acknowledgement protocol that explicitly requires replay of unacknowledged/bad TLPs; and
      initialize and manage all flow control credits.

2. The memory system of claim 1, wherein the second modular PCIe unit comprises:
   a second PCIe phy;
   a second PCIe link module coupled to the second PCIe phy;
   a second PCIe transaction component coupled to the second PCIe link module; and
   a second SoC specific device coupled to the second PCIe transaction component.

3. The memory system of claim 2, wherein the single interconnection bus is coupled to the first modular PCIe unit and the second modular PCIe unit at a location disposed:
   between the first PCIe phy and the first PCIe transaction component in the first modular PCIe unit; and
   between the second PCIe phy and the second PCIe transaction component in the second modular PCIe unit.

4. The memory system of claim 3, wherein the location is disposed:
   between the first PCIe phy and the first PCIe link module in the first modular PCIe unit; and
   between the second PCIe phy and the second PCIe link module in the second modular PCIe unit.

5. The memory system of claim 1, wherein the single interconnection bus is coupled between the first PCIe phy and the first PCIe link module.

6. The memory system of claim 5, wherein the first PCIe phy has a single lane coupled to the single interconnection bus.

7. The memory system of claim 6, wherein the first PCIe link module has four lanes coupled to the single interconnection bus.

8. The memory system of claim 1, wherein the single interconnection bus is coupled to the first PCIe link module.

9. The memory system of claim 1, further comprising a plurality of additional modular PCIe units.

10. A device, comprising:
   a host device;
   a storage device; and
   an interface device coupled between the host device and the storage device, the interface device including a plurality of modular PCIe units,
   wherein:
      the plurality of modular PCIe units are coupled together with a single interconnection bus;
      the single interconnection bus is directly coupled to each modular PCIe unit, wherein the plurality of modular PCIe units can communicate through the single interconnection bus, wherein the single interconnection bus is configured to combine a portion of data sent through the plurality of modular PCIe units as one data address; and
      at least one of the plurality of modular PCIe units is configured to:
         sequence all transaction layer packets (TLPs) that are generated by a PCIe transaction component;
         ensure reliable delivery of TLPs between two endpoints via an acknowledgement protocol that explicitly requires replay of unacknowledged/bad TLPs; and
         initialize and manage all flow control credits.

11. The device of claim 10, wherein each modular PCIe unit has a PCIe phy and a SoC specific device.

12. The device of claim 11, wherein the SoC specific device performs a distinct, unique process.

13. The device of claim 11, wherein the single interconnection bus is coupled to each modular PCIe unit at a location disposed between the PCIe phy and the SoC specific device.

14. A method of delivering data to a host device, comprising:
   retrieving data from a memory device;
   delivering a first portion of the retrieved data to a first modular PCIe unit, wherein the first modular PCIe unit has first command data that indicates the first portion of the retrieved data is less than all the retrieved data;
   delivering a second portion of the retrieved data to a second modular PCIe unit, wherein the second modular PCIe unit has second command data that indicates the second portion of the retrieved data is less than the retrieved data;
   passing all the data through a single interconnection bus;
   delivering the first portion of the retrieved data from the first modular PCIe unit to the host device;
   delivering the second portion of the retrieved data from the second modular PCIe unit to the host device, wherein the first modular PCIe unit can communicate with the second modular PCIe unit through the single interconnection bus, wherein the single interconnection bus is configured to combine the first portion of the retrieved data sent through the first modular PCIe unit and the second portion of the retrieved data sent through the second modular PCIe unit as one data address;
   sequencing all transaction layer packets (TLPs) that are generated by a PCIe transaction component;
   ensuring reliable delivery of TLPs between two endpoints via an acknowledgement protocol that explicitly requires replay of unacknowledged/bad TLPs; and
   initializing and managing all flow control credits.

15. The method of claim 14, wherein the retrieved data is available to both the first modular PCIe unit and the second modular PCIe unit at the single interconnection bus.

16. A method of receiving data, comprising:
   receiving a first portion of data from a host device through a first phy of a first modular PCIe unit;
   receiving a second portion of data from the host device through a second phy of a second modular PCIe unit;
   passing the first portion of the data and the second portion of the data through a single interconnection bus;
   sending a first portion of retrieved data to the first modular PCIe unit, wherein the first modular PCIe unit has first command data that indicates the first portion of the retrieved data is less than the retrieved data;
   sending a second portion of the retrieved data to the second modular PCIe unit, wherein the second modular PCIe unit has second command data that indicates the second portion of the retrieved data is less than the retrieved data, wherein the first modular PCIe unit can communicate with the second modular PCIe unit through the single interconnection bus, wherein the single interconnection bus is configured to combine the first portion of the retrieved data sent through the first modular PCIe unit and the second portion of the retrieved data sent through the second modular PCIe unit as one data address; and
   writing data from the first modular PCIe unit and second modular PCIe unit to a memory device, wherein at least one of the first modular PCIe unit and the second modular PCIe unit is configured to:
      sequence all transaction layer packets (TLPs) that are generated by a PCIe transaction component;
      ensure reliable delivery of TLPs between two endpoints via an acknowledgement protocol that explicitly requires replay of unacknowledged/bad TLPs; and
      initialize and manage all flow control credits.

17. The method of claim 16, further comprising receiving a third portion of data from the host device through a third phy of a third modular PCIe unit.

18. A memory system, comprising:
   a first means to communicate with a host device;
   a second means to communicate with the host device, wherein:
      the first means is coupled to the second means with an interconnection bus;
      the interconnection bus is coupled to the first means at a location within the first means; and
      the interconnection bus is coupled to the second means at a location within the second means, wherein the first means communicates with the second means through the interconnection bus, wherein the interconnection bus is configured to combine a portion of data sent through the first means and the second means as one data address;

wherein at least one of the first means and the second means is configured to:

sequence all transaction layer packets (TLPs) that are generated by a PCIe transaction component;

ensure reliable delivery of TLPs between two endpoints via an acknowledgement protocol that explicitly requires replay of unacknowledged/bad TLPs; and initialize and manage all flow control credits.

19. The memory system of claim 18, wherein the first means comprises:

a first phy;

a transaction component for splitting transactions; and a SoC specific device to determine where to store data.

20. The memory system of claim 19, wherein the interconnection bus is coupled to the first means at a location disposed between the first phy and a link module to sequence all transaction layer packets (TLPs).

21. The memory system of claim 19, wherein the interconnection bus is coupled to the first means at a location disposed between the first phy and a transaction component for splitting transactions.

22. The memory system of claim 18, wherein the first means is configured to ensure reliable delivery of TLPs.

23. The memory system of claim 18, wherein the first means is configured to initialize and manage all flow control credits.

* * * * *